Figure 1:
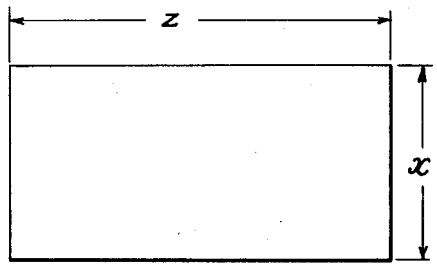

Nov. 18, 1952  W. F. THOMAS  2,618,050
MANUFACTURE OF BEARINGS
Filed Jan. 8, 1947

INVENTOR.
WILLIAM FREDERICK THOMAS
BY Fay, Golrick & Fay
ATTORNEYS

Patented Nov. 18, 1952

2,618,050

UNITED STATES PATENT OFFICE 2,618,050

MANUFACTURE OF BEARINGS

William Frederick Thomas, London, England, assignor to Vandervell Products Limited, London, England, a British company Application January 8, 1947, Serial No. 720,695
In Great Britain December 31, 1945

Section 1, Public Law 690, August 8, 1946
Patent expires December 31, 1965

3 Claims. (Cl. 29—149.5)

This invention relates to the manufacture of bearings and more specifically to the manufacture of semi-cylindrical liners, or half bearings, from metal strip which consists either of a single ply or of two, three or more plies of different metals mutually bonded together.

According to the present practice, a flat rectangular blank cut from metal strip comprising two or more plies is given the form of a semi-cylindrical liner or half bearing by die forming on a press in such a manner that the metal is confined on the parting lines and upset towards the area 90° from the two parting lines. This operation is variously described in the art as coining, coin pressing, upsetting, stamping and forming, and is hereinafter referred to simply as "pressing." This pressing operation results in thickening the wall of the bearing at two areas some 20° from the parting line, but this thickening of the wall does not extend to the area 90° from the parting line. The extent of the local thickening of the wall by the pressing operation, is of the order of a few thousandths of an inch. The excess metal is removed by a subsequent machining operation, so that the characteristics and performance of the finished bearing are not affected by the variations in wall thickness caused by the pressing operation so long as the thickness of the innermost bearing metal layer is large compared with the extent of the thickening.

However, in the case of certain heavily loaded bearings which are of great importance in modern practice, it is necessary to use very thin bearing layers supported either directly on a steel or other backing layer or on some intermediate layer interposed between the backing layer and the bearing layer. The thickness of these bearing layers is comparable with the variations in wall thickness produced by the conventional pressing operation, so that the subsequent final machining of the bore substantially reduces the thickness of (or even completely removes) the bearing layer at the points where maximum thickening took place.

We have found that it is possible to control the variations in wall thickness produced by the pressing operation by varying at appropriate points the length of the blank, that is the dimension of the blank which corresponds to the length parallel to its axis of the semi-cylindrical liner formed by the pressing operation. The present invention may therefore be said to consist broadly in using for the manufacture of bearings of the type described a blank whose axial length varies from point to point along its circumferential width.

The exact form given to the blank will clearly depend upon the result which it is desired to produce. If it is desired that after the pressing operation the wall thickness should be as nearly as possible uniform around the circumference of the half bearing, the blank is given a "waisted" form, the length being a minimum in the centre of the width of the blank and gradually increasing towards each side edge of the blank. In general it may be said that from point to point around the circumference of the half bearing the length of the blank will decrease in the direction in which (as compared with the result obtained with the conventional method using a retangular blank) is is desired to produce a flow of metal during the pressing operation.

By the use of the invention it is possible to control very exactly variations from point to point in the wall thickness of the semi-cylindrical shell resulting from the pressing operation. In cases where the bearing metal is applied to its supporting backing before the pressing operation, the wall thickness of the shell pressed from the two or more ply blank may be held so uniform that after final machining the thickness of the bearing metal layer will be substantially uniform, even though the finished thickness of this layer is the minimum now employed. In cases where the semi-cylindrical shell resulting from the pressing operation forms only the supporting backing, which may consist either of a single ply or of two or more plies, the bearing metal being subsequently coated on to the inner surface of the shell by casting or electro-deposition, the wall thickness of the shell may be held so uniform as to avoid the necessity for the usual machining operation on the bore of the formed shell before the application of the bearing metal.

A further advantage of using the waisted blank of the present invention to give a formed shell of uniform wall thickness lies in the fact that the metal of the blank takes up its final shape with considerably less strain and deformation of the structure than is the case in normal practice.

Where the strip consists of two or more plies there is thus less strain at the joint or joints between the various plies.

Figure 2:
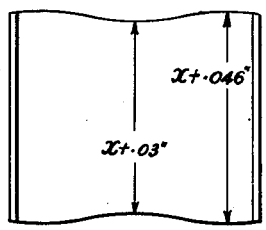
Figure 4:
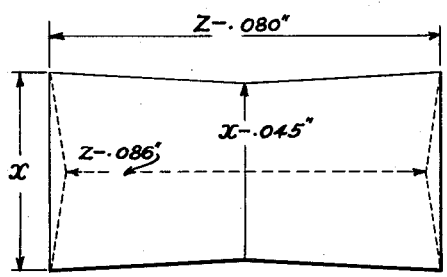
Figure 3:
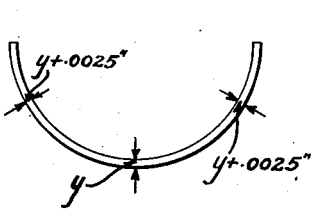
Figure 5:
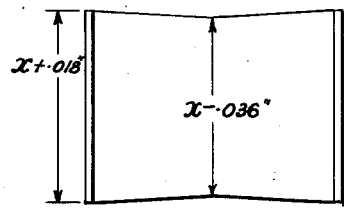
Figure 6:
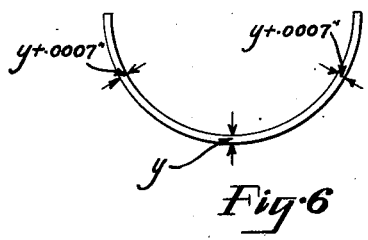

An example of the manner in which the invention may be carried into practice and of the results that can be obtained by its use is illustrated in the accompanying drawing. In this drawing the Figure 1 represents a plan view of a conventional rectangular blank and Figures 2 and 3 represent plan and elevational views of the semi-cylindrical shell produced by pressing this blank in the conventional manner. Figures 4, 5 and 6 represent views, similar respectively to Figures 1, 2 and 3, of a corresponding blank and shell produced by the practice of the present invention.

The conventional rectangular blank shown in Figure 1 has a length $x$ of 1.6 inches, a thickness $y$ of 0.087 inch and a width $z$ of 4.660 inches. The width of the blank is greater than would correspond to the circumference of the finished half bearing (which is required to have an external diameter of 2.917 inches) after making allowance for the removal of 0.015 inch by a subsequent machining operation from each of the parting line edges of the formed shell, so as to ensure that during the pressing operation sufficient deformation of the metal takes place to cause the outer surface of the blank to come into contact with the enclosing die. The shell obtained by pressing this blank and shown in Figures 2 and 3 has in the centre of its width (that is at 90° to the parting line) the same wall thickness as the blank, but at the two areas some 20° from the parting line the wall thickness is increased by 0.0025 inch. The upsetting of the metal in the pressing operation also causes the length of the shell to be increased over that of the blank, as indicated in Figure 2, the maximum increase in length being at the areas of greatest increase in wall thickness.

The waisted blank of the present invention shown in Figure 4 has the same thickness as the blank of Figure 1 and at its side edges the same length. From each end edge of the blank, however, there is removed a triangular strip having its maximum width in the centre of the blank, so that the length of the blank in the centre of its length is 0.045 inch less than at the side edges. The semi-cylindrical shell of Figures 5 and 6, produced by pressing the waisted blank of Figure 4, has a maximum variation in wall thickness of only 0.0007 inch. The width of the waisted blank is reduced as compared with that of the conventional blank by 0.030 inch, since in the pressing of this blank the metal takes up its final shape far more readily than does the conventional rectangular blank, and it is accordingly possible to reduce the strain and deformation of the structure necessary to induce the required conformity of the outer surface of the shell with the surrounding die.

While the degree of uniformity of wall thickness obtained in the pressed shell by the use of a waisted blank such as is above described will be sufficient for most purposes, there are cases in which an even greater degree of uniformity is necessary or desirable. For example, in a case in which the semi-cylindrical shell resulting from the pressing operation has a thin layer of bearing metal coated onto its inner surface by electrodeposition, the final thickness of the bearing metal layer after finish machining may be comparable with the small variations in wall thickness still present in a shell such as that of Figures 2 and 3. In such cases, in order to avoid the necessity for a machining operation upon the bore of the shell before the deposition of the bearing metal layer, the blank may be "waisted" on its side edges as well as on its end edges. In the blank of Figure 4, the removal from each side edge of the blank of a triangular strip having a minimum width in the centre of the length of the blank of only 0.003 inch (as indicated in dotted lines in the figure) is sufficient to eliminate substantially completely the small variations in wall thickness obtained in the pressed shell of Figures 5 and 6.

It will, of course, be understood that in the drawing the variations in the length and width of the blank of Figure 4 and in the length of the pressed shells of Figures 2 and 5 are shown on a greatly exaggerated scale, the actual extent of the variations being shown by the dimensions quoted above and by the legends on the drawing.

It will also be understood that the invention is not limited to so shaping the blank that the wall thickness will be uniform around the circumference of the bearing. It may also be used to produce whatever variations in wall thickness are desired. For example it may be desirable to produce a thickening of the wall (which will result after the final machining of the bore in a reduction of the thickness of the bearing layer) at points of maximum loading.

I claim:

1. A method of manufacturing semi-cylindrical sleeve bearings comprising the steps of forming a substantially rectangular, metal blank with a first pair of opposite edges parallel to each other and a second pair of opposite edges having the distance between them at a minimum in the center of the blank between said first pair of opposite edges and gradually increasing toward the same so as to provide a central zone of minimum distance extending between said second pair of opposite edges; and then curving the blank about an axis substantially parallel to one of said pairs of opposite edges into a semi-cylindrical shell and applying upsetting pressure against said one pair of opposite edges to cause the metal of the blank to flow from side zones adjacent said first pair of opposite edges toward said central zone of minimum distance extending between said second pair of opposite edges, whereby a bearing shell of substantially uniform thickness is produced.

2. A method as defined in claim 1 and wherein said axis about which the blank is curved is substantially parallel to said first pair of opposite edges.

3. A method of manufacturing a semi-cylindrical sleeve bearing comprising the steps of forming a substantially rectangular, metal blank, having a first pair of opposite edges and a second pair of opposite edges, with said first pair of opposite edges having the distance between them at a minimum in the center of the blank between said second pair of opposite edges and gradually increasing toward the same so as to provide a first central zone of minimum distance extending between said first pair of opposite edges and with said second pair of opposite edges having the distance between them at a minimum in the center of the blank between said first pair of opposite edges and gradually increasing toward the same so as to provide a second central zone of minimum distance extending between said second pair of opposite edges; and then curving the blank about an axis substantially parallel to one of said pairs of opposite edges into a semi-cylindrical shell and applying upsetting pressure against said one pair of opposite edges of said blank to cause the metal of said blank to flow toward said first and second central zones of minimum distance, whereby a bearing shell of substantially uniform thickness is produced.

WILLIAM FREDERICK THOMAS.

REFERENCES CITED

The following references are of record in the file of this patent:

UNITED STATES PATENTS

| Number | Name | Date |
|---|---|---|
| 1,213,684 | Osterholm | Jan. 23, 1917 |
| 1,464,929 | Goldsmith | Aug. 14, 1923 |
| 1,536,280 | Avery | May 5, 1925 |
| 1,544,715 | Avery | July 7, 1925 |
| 1,794,184 | Leis | Feb. 24, 1931 |
| 1,797,752 | Blackmore | Mar. 24, 1931 |
| 2,338,858 | Lignian | Jan. 11, 1934 |
| 2,424,092 | Hammond et al. | July 15, 1947 |

FOREIGN PATENTS

| Number | Country | Date |
|---|---|---|
| 249,483 | Great Britain | Dec. 9, 1926 |